July 24, 1951  O. BACHMANN  2,561,436
ENGRAVING MACHINE
Filed June 30, 1945  8 Sheets-Sheet 1

Inventor
Oscar Bachmann
by Singer, Ehlert, Stern & Carlberg
Attorneys

July 24, 1951  O. BACHMANN  2,561,436

ENGRAVING MACHINE

Filed June 30, 1945  8 Sheets-Sheet 3

July 24, 1951  O. BACHMANN  2,561,436
ENGRAVING MACHINE

Filed June 30, 1945  8 Sheets-Sheet 5

Inventor
Oscar Bachmann
by Singer, Ehlert, Stern & Carlberg
Attorneys

July 24, 1951  O. BACHMANN  2,561,436
ENGRAVING MACHINE

Filed June 30, 1945  8 Sheets-Sheet 8

Inventor
Oscar Bachmann
by Singer, Ehlert, Stern & Carlberg
Attorneys

Patented July 24, 1951

2,561,436

UNITED STATES PATENT OFFICE 2,561,436

ENGRAVING MACHINE

Oscar Bachmann, Zurich, Switzerland

Application June 30, 1945, Serial No. 602,616
In Switzerland May 16, 1944

6 Claims. (Cl. 33—27)

The present invention relates to a new and improved machine for engraving plates for producing patterns to be reproduced by any known and suitable process.

The invention resides in an engraving machine having motor driven change speed gear operating a pantograph connected to the plate to be engraved. A stylii carrier is arranged on the plate and carries a plurality of engraving stylii of which several or all may be set to trace curves on the plate.

In the accompanying drawing a preferred embodiment of the machine is shown by way of example.

Figure 3:
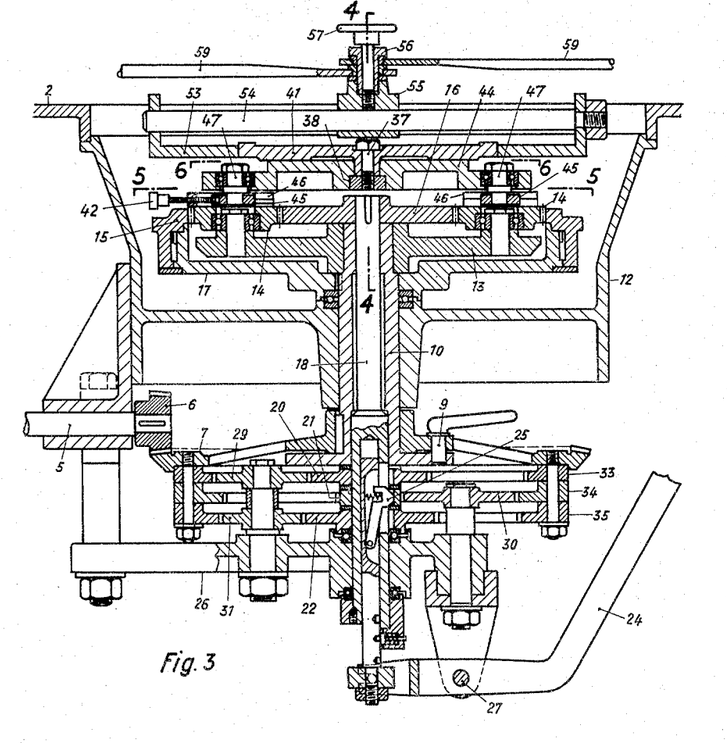
Fig. 3 is a cross-section on the line 3—3 of Fig. 2.

The machine comprises a table 1 with a plate 2 below which a motor 3 is arranged driving, by a belt 4 and pulley, a shaft 5. On the shaft 5 a bevel pinion 6 is mounted meshing with a bevel gear 7 (Fig. 3). The bevel gear 7 is connected by means of a bolt 9 with a hollow shaft 10 rotatably mounted in a casing 12 fixed to the table plate 2. On the upper end of the hollow shaft 10 a carrier 13 is rotatably mounted on which two toothed gears 14 are rotatably mounted. The gears 14 are in mesh with an internally toothed ring 15 and with a toothed gear 16. The internally toothed ring 15 is fixedly secured to a disk 17 which is rigidly connected to the hollow shaft 10. The gear 16 is fastened to a shaft 18 rotatably mounted in the hollow shaft 10. On the shaft 18, the gears 20, 21, 22 are loosely mounted, any one of which may be coupled at will with the shaft 18 by means of a radially and axially displaceable key 25 which may be operated by a hand lever 24. The lower end of said shaft 18 is journalled in a support 26 carrying the pivot 27 of the lever 24. Each of the gears 20, 21 22 is in engagement respectively with a gear 29, 30, 31 mounted on the support 26. The gears 29, 30, 31 are in mesh respectively with internally toothed annular gears 33, 34, 35 rigidly connected with the bevel gear 7.

Figure 4:
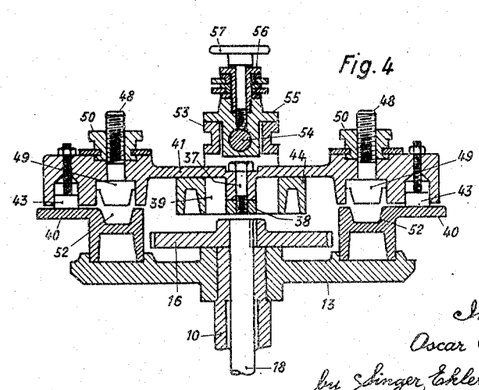
Figs. 4 to 6 are, respectively, sections taken on the lines 4—4, 5—5 and 6—6 of Fig. 3.

On the carrier 13 (Fig. 4) two supports 40 are fastened on which a disk 41 is movably mounted by means of two sliding pieces 43. On the disk 41 a guide piece 38 is fastened by a screw bolt 37. The guide piece 38 is slidably arranged in a slot 39 (Fig. 6) of a plate 44 carrying two stop pieces 45 arranged on two bolts 47. The stop pieces 45 run in guides 46 each fixed on a gear wheel 14. On disk 41 two screw threaded bolts 48 are mounted, each being provided with a head 49 and being adjustable as to depth to which they enter grooves 52 in the support 40. They are adjusted and held in their position by means of nuts 50. On the disk 41 a member 53 is rotatably mounted for adjustment, and has a rod 54 secured thereto. On the rod 54 is arranged a slide 55 provided with a sleeve 56. By a screw bolt 57, passing through sleeve 56 the slide 55 may be fastened on the rod 54.

Figure 1:
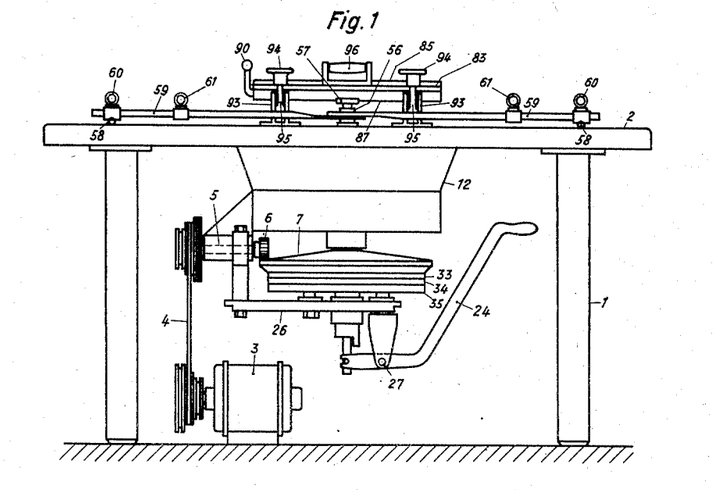
Fig. 1 is a side elevation.
Figure 2:
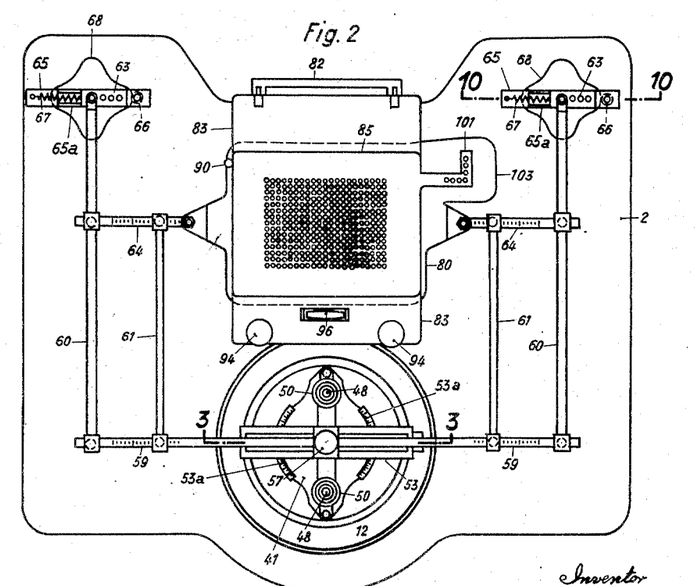
Fig. 2 a top view of the new machine

On the sleeve 56 two rods 59 of a pantograph are mounted. The said rods 59 project in opposite directions; the outer ends thereof rest by means of rollers 58 (Fig. 1) on the table 2. To each of the rods 59 (Figs. 1, 2) two rods 60, 61 are pivotally connected by one end. The free end of the rods 60 are each connected with a bearing 63 (Figs. 2, 10, 11) and the free end of each rod 61 is connected to a lever 64 (Fig. 2). The levers 64 are pivotally mounted on a plate 80 (Figs. 2, 7, 8, 9) which is mounted on balls 81 and which may be moved within certain limits on the table 2. The rods 64 are connected with the rods 60 by swivel joints. Each of the bearings 63 is slidably mounted in a groove 65a of a bar 65. In each of the bearings 63 a roller 66 is mounted which by the action of a spring 67 is constantly kept in contact with a cam 68. The bar 65 is fixed on a shaft 69 passing through a bore of cam 68. The cams 68 are changeably mounted on the table 2; they are preferably composed of two parts. Each shaft 69 carries a bevel wheel 71 (Figs. 11, 12) each meshing with another bevel gear 72 on shaft 73. On each of the shafts 73 other bevel gears 74 are fastened meshing with a gear 75 fixed to shaft 76. The latter is in engagement by a bevel gear 77 which is in mesh with the gear 7. The shaft 76 is bi-partite, the parts are interconnected by a clutch 78, so that the drive of the bearing 63 may be interrupted when desired.

Figure 7:
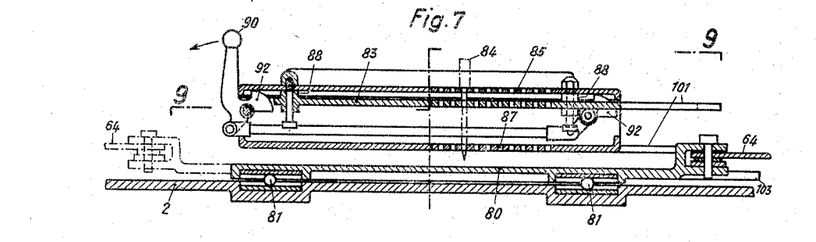
Figs. 7 and 8 show parts of the table for the patterns and connections of the table with the pantograph along the sectional lines 7—7 and 8—8 of Fig. 9.
Figure 8:
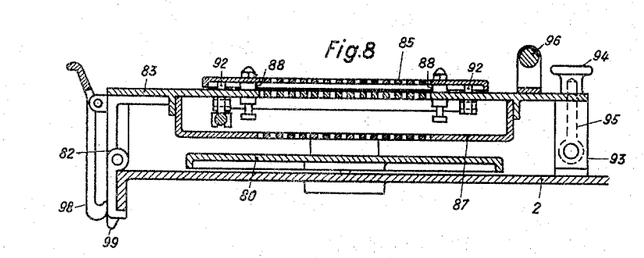
Figure 9:
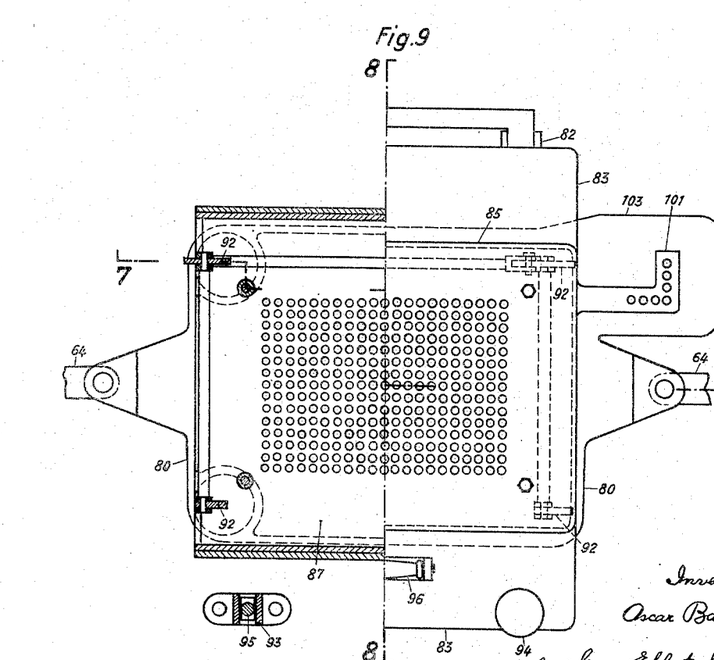
Fig. 9 is a section taken on line 9—9 of Fig. 7.
Figure 10:
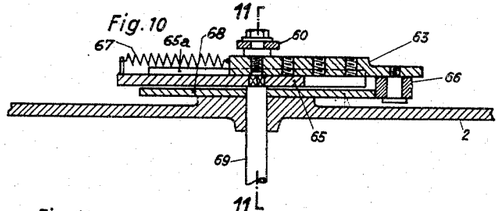
Fig. 10 is a section taken on line 10—10 of Fig. 2.

On the plate 80 fixing means to hold the plates, for instance, of glass or metal, are arranged on which the patterns are to be produced. On the table top 2 a holder for the stylus 84 is mounted by means of a hinge 82 (Figs. 7, 8, 9). The holder comprises a table 83 and above same a plate or carrier 85 adapted to receive the stylus 84 and below same a guide plate or carrier 87. The plate or carrier 85 rests on lugs 88 on the table 83 and may be lifted by means of a handle 90. By tilting the handle 90 from the upright position shown in Fig. 7 into the horizontal position four cams 92 are moved raising the plate or carrier 85 with the styli mounted thereon. By doing so all the styli 84 are brought out of their working position in their axial direction. The cover plate 83 rests on two supports 93 (Fig. 8) and is held firmly in its position by screw bolts 95 and nuts 94. A handle 96 is provided to assist the lifting of the members 83, 85, 87 and the turning of the same on the hinge 82. By raising the said plates a hook 98 passes under a projection 99 and secures the holder of the styli in its raised or slanting position. In this position the table 80 is free to be worked on. Each of the plates or carriers 85, 87 is provided with an arm 104 in which some styli 84 may be arranged. By these styli samples of the patterns may be produced on a small plate fastened on an extension 103 of the table 80. The said styli moreover allow the examination of the patterns produced when the machine is working without stopping the machine.

Figures 5, 6, 11, 12, 13, 14:
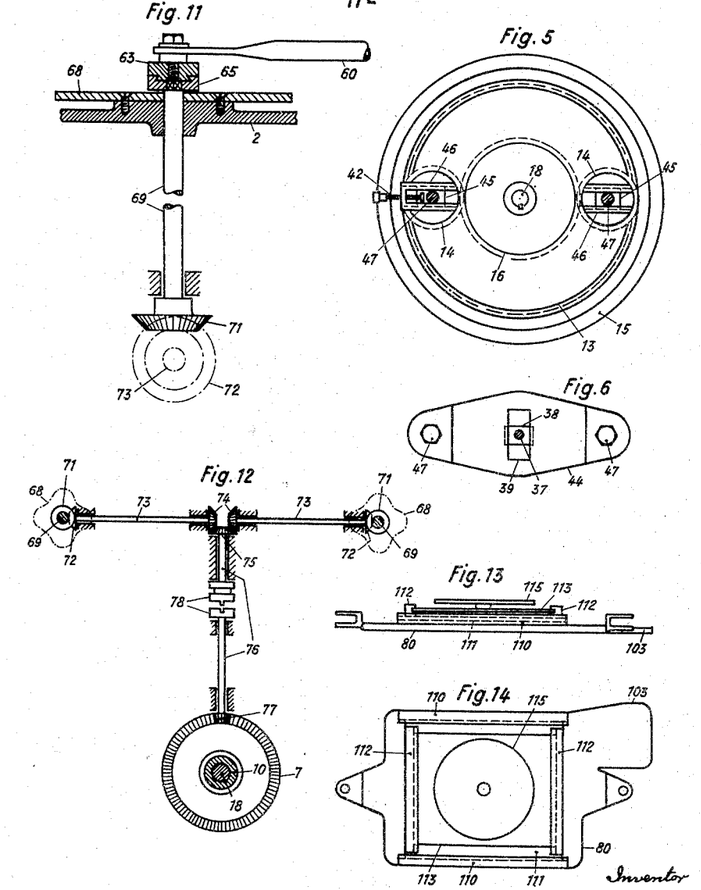
Fig. 11 is a section taken on line 11—11 of Fig. 10.
Figs. 12 to 14 show details of construction in a diagrammatic manner.

To produce a great number of patterns simultaneously the table 80 is provided with the auxiliary device shown in Figs. 13 and 14. On the table 80 two guide ways 110 are fixed in which a plate 111 is slidably mounted. The plate 111 is provided with two guide ways 112, the latter run at a right angle with reference to the guide ways 111. In the guide way 112 a plate 113 is slidably mounted and on the latter a disk 115 is rotatably mounted adapted to be fixed in any position. On the disk 115 the plates may be fastened on which the patterns are to be produced. The disk 115 might be fastened on to the table 80.

Figure 15:
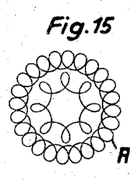
Figs. 15 to 36 represent some of the designs which may be produced by the new machine.
Figure 16:
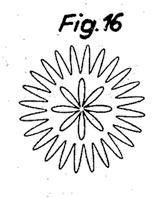

The working of the machine is as follows: The motor 3 drives by means of belt 4 the shaft 5 and the bevel gearing 6, 7 and therewith by bolt 9 the hollow shaft 10 and the internally toothed annular gear 15. Simultaneously the toothed gears 33, 34, 35 are driven by gear 7. The said gears 33, 34, 35 drive by the intermediate gears 29, 30, 31 the wheels 20, 21, 22. As shown in Fig. 3 the wheel 21 drives by means of the key 25 the shaft 18 and therewith the toothed gear 16. The gears 14, 15, 16 form a differential gearing. The gears 14, 15 on the support 13 rotate about their axes and also travel bodily about the axis of the shafts 10, 18. The guiding means 46 attached to the gears 14, 15 force the holder 44 to take part in their bodily movement by the members 45 and 47. In Fig. 3 the sleeve 56 is co-axially arranged with reference to shaft 18 and the bolts 47 are co-axial with respect to the gears 14. If the member 53 is rotated the sleeve 56 will turn about its own axis, but will not move bodily. The pantograph connected therewith is not moved at all and the plate 80 remains at rest. By moving the slide 55 on the rod 54 the said slide 55 performs a circular path around the axis of the shafts 10, 18. This movement is transmitted to the plate 80 and each stylus now performs work on said plate by engraving a circle thereon. By turning the screw 42 (Figs. 3, 5) the stops 45 are displaced in their guides and therewith the parts 47, 44, 41, 53 and 55. The axes of the bolts 47 are thus moved out of centre with respect to the gears 14 and perform a circular path which motion is transmitted by the parts 44, 41, 53, 54, 55, 56 and by the pantograph to the plate 80. The movement of this plate 80 is composed of two circular movements and each stylus will engrave a loop A, Fig. 15, on said plate 80. If by lever 24 the key 25 is brought into engagement with gear 22 or 20, the speed of the shaft 18 and therewith of the wheels 16 and 14 and of the parts 44, 41, 53 to 56 will be varied. For each full turn a greater or a fewer number of loops may be produced on the plate 80. When the heads 49 are positioned as shown in Fig. 4, the disk 41 is free to travel a path equal to the length of the slot 39. The movement of the disk can, however, be limited by positioning the heads 49 in the grooves 52 by means of the nuts 50. Because of the shape of the heads 49 and grooves 52, the movement of the disk 41 can be variably limited according to the setting of the head 49. By rotating the gears 15, 16 the members 44, 41, 53 of the device are turned and the disk 41 is displaced in the slot 39 on the support 44. From the rotary and the linear motions of the said members a resultant motion of the slide 55 is produced so that a curve like a closed sine curve shown in Fig. 16 is engraved on the plate 80. More or less curves may be drawn on each rotation according to the position of the key 25.

Figure 17:
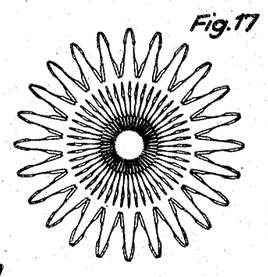

By displacing the members 49 by means of the nut 50 only so much that they project into the grooves 52 but do not bear on the lateral walls, the slanting faces of the grooves 52 strike alternately on the members 49 during the rotation of the carrier 13. Owing to that the sine curve will be deformed as shown in Fig. 17. The distortion of the curve corresponds to the setting of the member 49 within the groove 52, as previously described with regard to Fig. 4.

Figure 18:
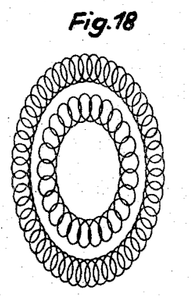

If some members of the pantograph are not uniformly displaced a pattern as shown in Fig. 18 will be produced. The loops are traced in an elliptic path. Instead of loops sine curves may be produced in an elliptic figure.

Figure 19:
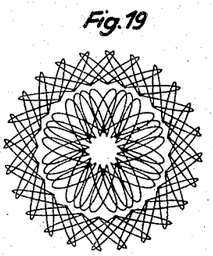

By turning the member 53 with reference to the support 44 (Figs. 2, 4) the sine-like curves are at an angle with reference to the centre of the rosette as shown in Fig. 19. The angular displacement may be varied within wide limits by turning the member 53 more or less, its position being read-off on the scale 53a.

Figure 20:
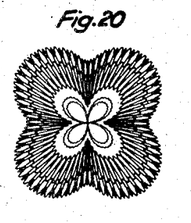

By closing the clutch 78 (Fig. 12), the gears 7, 75, 74, 72, 71 and therewith both the bars 65 and bearing 63 are turned. As the rollers 66 of the pantograph run on the circumference of the cams 68 the said pantograph transmits the shape of the cams 68 to plate 80. The pattern produced is shown in Fig. 20.

Figure 21:
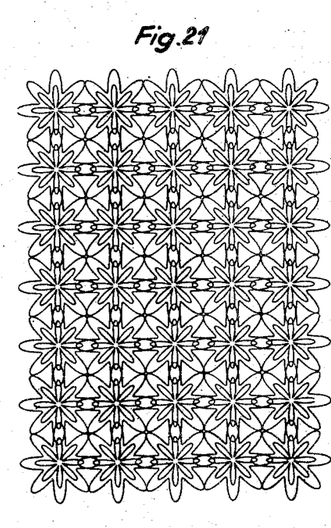

In Fig. 21 a pattern is shown which has been produced by thirty-five styli. Each stylus has to produce in a first operation the inner figure and in a second operation the outer closed line.

Figure 22:
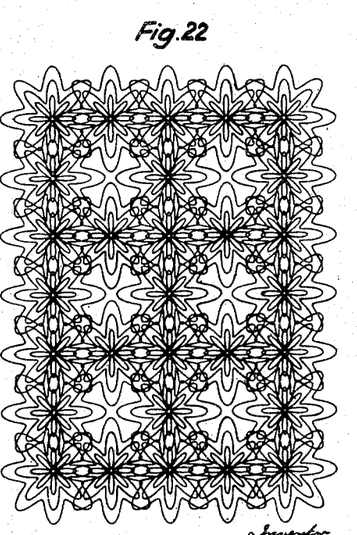

The pattern shown in Fig. 22 has been produced in three consecutive operations, each stylus has to trace one closed curved line in one operation.

Figure 23:
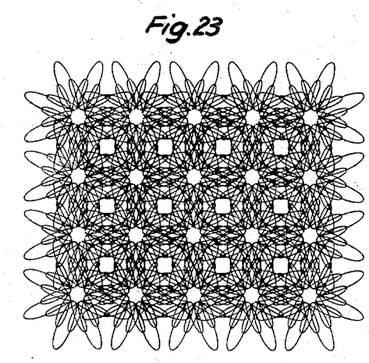
Figure 24:
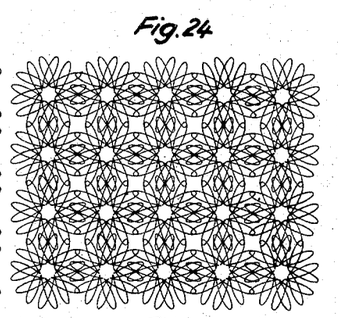
Figure 25:
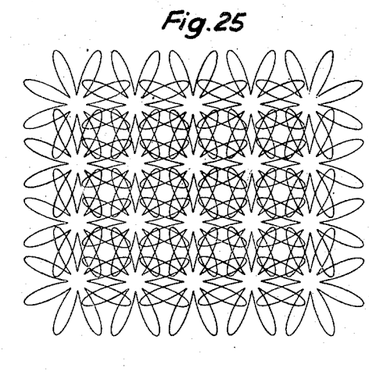

Fig. 23 shows a pattern which is composed of the two patterns illustrated in Figs. 24 and 25. Each of the said patterns shown in Figs. 24 and 25 had been engraved on a separate plate and the pattern had been combined to that shown in Fig. 23 by subsequently printing. The pattern shown in Figs. 24, 25 may be reproduced in different colours.

Figure 26:
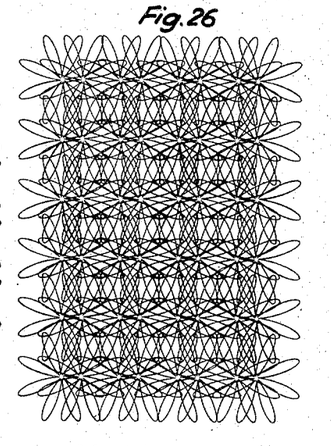
Figure 27:
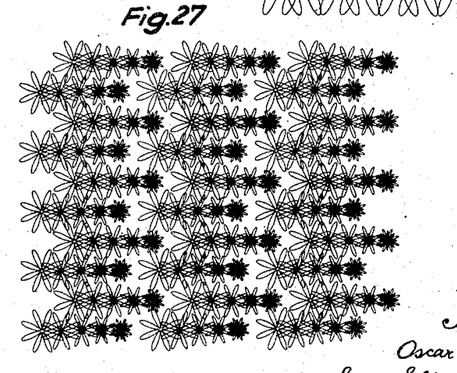

By displacing one of the slides 111 or 113 (Figs. 13, 14) the pattern may be placed to overlap each other or to superimpose one on the other as shown in Figs. 26 and 27. The size of the individual patterns might be varied by turning the screw 42.

Figures 28, 29, 30:
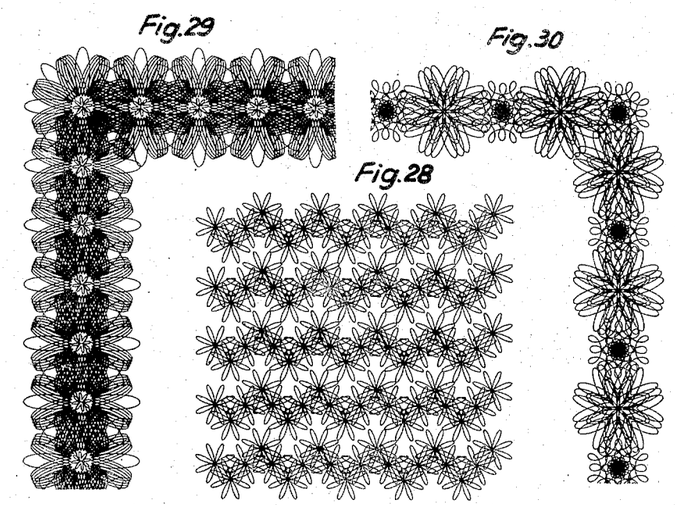

By making use of the two auxiliary plates 111 and 113 the two patterns can be arranged in an oblique direction as illustrated in Fig. 28.

Fig. 29 shows a corner of a border in which the pattern is repeated. By placing a plurality of styli at regular distances apart and in rows according to the design the whole pattern may be produced.

The pattern shown in Fig. 30 has been produced in the following manner: At first only each second stylus of a row of styli is set to produce the larger rosettes of the border. Each of said rosettes is traced in five separate operations. After said figures have been completed the styli are displaced and the smaller figures arranged between the finished parts are now traced in five operations.

Figure 31:
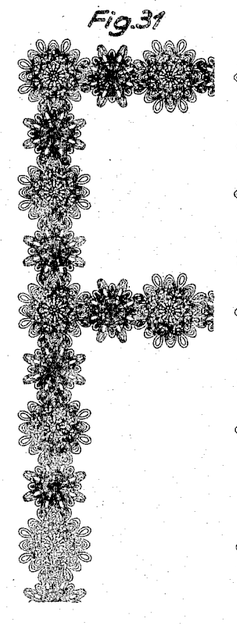
Figure 32:
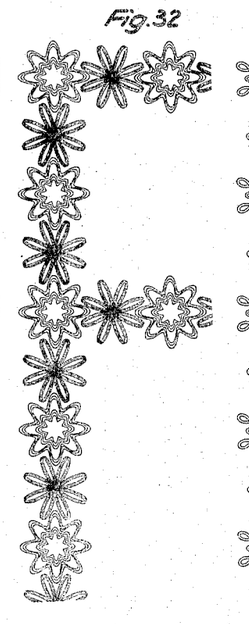
Figure 33:
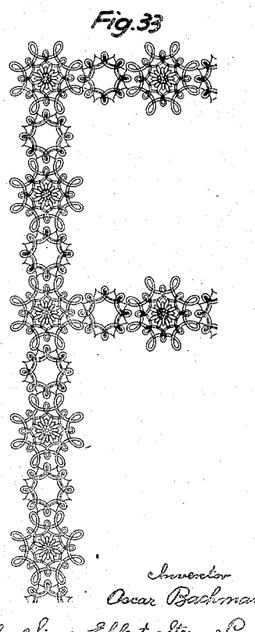

Fig. 31 shows a pattern composed of the two ornaments shown in the Figs. 32 and 33. This pattern may be reproduced in two colours.

Figures 34, 35:
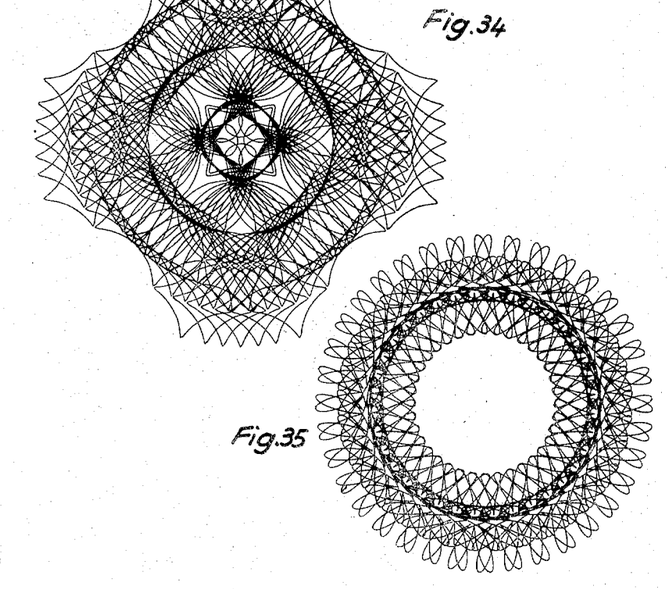

In Fig. 34 a rosette is shown which may be used at the centre of a larger pattern. To obtain the pattern the plate on which the curves are to be traced is mounted on the disk 115.

A similar rosette is shown in Fig. 35 which has been produced by making use of the disk 115. Four styli are used simultaneously at equal distances apart and from the centre of the disk 115. Having completed a part of the pattern the disk 115 is displaced for a certain angle until the whole pattern is complete after a turn of the disk through 90 degrees.

Figure 36:
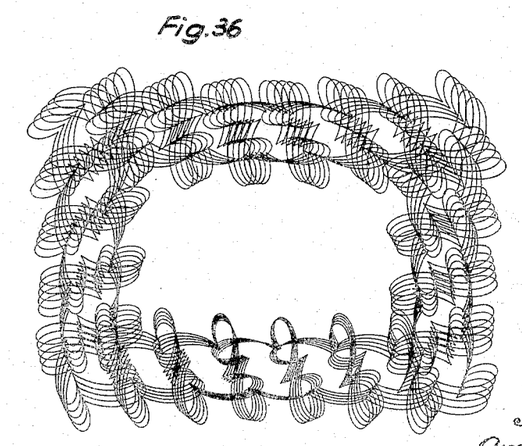

The pattern shown in Fig. 36 may be produced by making use of the means described and in the manner aforesaid.

Beside the pattern shown and described a great variety of other curves and pattern may be produced which are of a highly ornamental character and which are not to be copied.

Having now particularly described and ascertained the nature of my said invention and in what manner the same is to be performed, I declare that what I claim is:

1. In an engraving machine, the combination with styli and a pattern plate adjustably mounted with respect to the machine proper, of a positively driven change speed gear, a disk slidably mounted with respect to said plate and arranged to be moved by said gear through an adjustable stroke, a plurality of cams, two bearings slidably mounted with respect to said plate, a pantograph mounted in said bearings, a driver mechanism connecting said disk to said pantograph, said bearings being arranged to cooperate with said cams to form the pattern according to the outline of said cams, means for connecting said pantograph to said plate to receive the pattern tracings by said styli, and a plurality of members adjustable with respect to said driver mechanism for attaining at least one distortion of the pattern.

2. In an engraving machine, the combination with styli and a pattern plate adjustably mounted with respect to the machine proper, of a positively driven change speed gear, a disk slidably mounted with respect to said plate and arranged to be moved by said gear through an adjustable stroke, a plurality of cams, two bearings slidably mounted with respect to said plate, a pantograph mounted in said bearings, a driver mechanism connecting said disk to said pantograph, said bearings being arranged to cooperate with said cams to form the pattern according to the outline of said cams, means for connecting said pantograph to said plate to receive the pattern tracings by said styli, a plurality of members adjustable with respect to said driver mechanism and other members cooperable with said adjustable members in such manner that adjustment of said adjustable member results in a break in the curves being traced or a distortion of the pattern is obtained.

3. In an engraving machine, the combination with styli and a pattern plate adjustably mounted with respect to the machine proper, of a positively driven change speed gear, a disk slidably mounted with respect to said plate and arranged to be moved by said gear through an adjustable stroke, a plurality of cams, two bearings slidably mounted with respect to said plate, a pantograph mounted in said bearings, a driver mechanism connecting said disk to said pantograph, said bearings being arranged to cooperate with said cams to form the pattern according to the outline of said cams, means for connecting said pantograph to said plate to receive the pattern tracings by said styli, a plurality of members adjustable with respect to said driver mechanism, said members being mounted on said driver mechanism and being adjustable with respect to each other in such manner that parts of the pattern are traced in more or less oblique positions.

4. In an engraving machine, the combination with styli and a pattern plate adjustably mounted with respect to the machine proper, of a positively driven change speed gear, a disk slidably mounted with respect to said plate and arranged to be moved by said gear through an adjustable stroke, a plurality of cams, two bearings slidably mounted with respect to said plate, a pantograph mounted in said bearings, a driver mechanism connecting said disk to said pantograph, said bearings being arranged to cooperate with said cams to form the pattern according to the outline of said cams, means for connecting said pantograph to said plate to receive the pattern tracings by said styli, and a member rotatably mounted for adjustment on said plate.

5. In an engraving machine, the combination with styli and a pattern plate adjustably mounted with respect to the machine proper, of a positively driven change speed gear, a disk slidably mounted with respect to said plate and arranged to be moved by said gear through an adjustable stroke, a plurality of cams, two bearings slidably mounted with respect to said plate, a pantograph mounted in said bearings, a driver mechanism connecting said disk to said pantograph, said bearings being arranged to cooperate with said cams to form the pattern according to the outline of said cams, means for connecting said pantograph to said plate to receive the pattern tracings by said styli, a second plate mounted on said pattern plate, and a third plate mounted on said pattern plate, said second plate and said third plate being arranged on said pattern plate so as to be adjusted at right angles to each other.

6. In an engraving machine, the combination with styli and a pattern plate adjustably mounted with respect to the machine proper, of a positively driven change speed gear, a disk slidably mounted with respect to said plate and arranged to be moved by said gear through an adjustable stroke, a plurality of cams, two bearings slidably mounted with respect to said plate, a pantograph mounted in said bearings, a driver mechanism connecting said disk to said pantograph, said bearings being arranged to cooperate with said cams to form the pattern according to the outline of said cams, means for connecting said pantograph to said plate to receive the pattern tracings by said styli, a plurality of members adjustable with respect to said driver mechanism for attaining at least one distortion of the pattern and carriers for the styli provided with an arm adapted to receive at least one stylus, said last named stylus being arranged to operate on said plate in such manner as to allow examination of the work of said styli while the same are at work.

OSCAR BACHMANN.

REFERENCES CITED

The following references are of record in the file of this patent:

UNITED STATES PATENTS

| Number | Name | Date |
|---|---|---|
| 9,743 | Blair | May 24, 1853 |
| 184,493 | Anderson | Nov. 21, 1876 |
| 481,893 | Bryce et al. | Aug. 30, 1892 |
| 638,411 | Fladva | Dec. 5, 1899 |
| 790,172 | Benton | May 16, 1905 |
| 1,254,003 | Stainkamp | Jan. 15, 1918 |
| 1,438,589 | Fetheroff | Dec. 12, 1922 |

FOREIGN PATENTS

| Number | Country | Date |
|---|---|---|
| 300,918 | Germany | Sept. 29, 1917 |